United States Patent [19]

Buchholz

[11] 4,167,387

[45] Sep. 11, 1979

[54] SEGMENT ROLL FOR A BRIQUET OR COMPACTING ROLL PRESS

[75] Inventor: Claus Buchholz, Obersulm-Eschenau, Fed. Rep. of Germany

[73] Assignee: Bepex GmbH, Leingarten, Fed. Rep. of Germany

[21] Appl. No.: 845,597

[22] Filed: Oct. 26, 1977

[30] Foreign Application Priority Data

Oct. 29, 1976 [DE] Fed. Rep. of Germany ....... 2649801

[51] Int. Cl.[2] ......................... B29C 1/00; B29C 15/00

[52] U.S. Cl. .................................... 425/470; 425/237; 29/124

[58] Field of Search ....................... 425/470, 471, 237; 29/124, 130

[56] References Cited

U.S. PATENT DOCUMENTS

| | | | |
|---|---|---|---|
| 644,442 | 2/1900 | McElroy | 29/124 X |
| 697,256 | 4/1902 | Kaplan | 425/470 |
| 861,888 | 7/1907 | Perkins | 29/124 X |
| 969,652 | 9/1910 | Parker | 29/124 |
| 1,217,287 | 2/1917 | Dillinger | 29/124 X |
| 3,029,566 | 4/1962 | Simendinger | 29/124 X |
| 3,385,557 | 5/1968 | Rambelle | 425/470 X |
| 3,989,441 | 11/1976 | Lauterbach | 425/471 |

FOREIGN PATENT DOCUMENTS

| | | | |
|---|---|---|---|
| 16661 | of 1906 | United Kingdom | 29/124 |
| 396574 | 8/1933 | United Kingdom | 29/124 |

*Primary Examiner*—Robert L. Spicer, Jr.
*Attorney, Agent, or Firm*—McDougall, Hersh & Scott

[57] ABSTRACT

Segments for briquetting and compacting rolls which include seats in the roll core and means for clamping the segments in place. The segments define side walls which are in facing relationship when the segments are assembled with the roll core. The side walls each define a groove and a sealing profile in the form of a rod of ductile material is positioned between opposed grooves. When the segments are clamped in place, the profiles are compressed and plastically deformed whereby an impenetrable barrier to the passage of particles between and beneath the segments is provided.

8 Claims, 4 Drawing Figures

SEGMENT ROLL FOR A BRIQUET OR COMPACTING ROLL PRESS

BACKGROUND OF THE INVENTION

This invention is directed to segment rolls for briquetting and compacting presses.

Briquetting and compacting of various materials have been undertaken for many years. Particular problems are presented, however, where briquetting and compacting procedures involve high temperature operations, for example, in the handling of iron ore. High pressures are involved in such processes as well as high temperatures. The maintenance of such pressures at elevated temperatures has resulted in wear problems so that replacement of rolls became necessary in many cases. This represented an expensive replacement operation and, in addition, it was necessary to leave equipment idle for extended periods to provide time for the replacement of the worn equipment.

Equipment has been developed which involves the utilization of roll segments attached to a roll core. Such roll segments are illustrated in U.S. Pat. Nos. 3,077,634 and 3,938,930. With the use of roll segments as described in the aforementioned patents, it was only necessary to replace worn segments when briquetting or compacting materials at elevated pressures and temperatures. These segments were attached in a manner that permitted quick replacement so that the expensive and time consuming task of replacing an entire roll could be eliminated.

Segmented rolls presented difficulties from another standpoint due to the fact that the material being handled often moved between and under the mold segments. This difficulty presented a particular problem when the materials to be formed were of very small article size and where high pressure and temperatures characterized the operation. The heat generated tended to create displacements between the segments and the roll core while the prevailing pressures caused the particulate material to move into spaces developed between displacements.

Attempts have been made to secure the roll inserts or segments in such a manner that they would not be significantly displaced even under the severe thermal conditions. As described, for example in the aforementioned U.S. Pat. No. 3,077,634, the mold segments were provided with diverging end walls and retainer rings were provided with mating surfaces for close engagement with the end walls. These retainer rings were in turn secured to the roll core.

This arrangement was not entirely satisfactory, and this was also true of the arrangement described in the aforementioned U.S. Pat. No. 3,938,930. In this system, shims of a low melting point metal were located between adjacent faces of the mold segments. When elevated temperatures in the order of 450° to 500° C. were achieved, for example, during processing of iron ore, the shims would melt. Upon reaching the shim melting point, in the order of 290° to 370° C., this material would become molten and would be displaced from the gaps between mold segments. This displacement occurred as a result of the expansion of the mold segments due to the temperature rise with the purpose being that the expansion would automatically take up the space previously occupied by the shims. This was intended to ensure the uniform placement and expansion movement of mold segments and thus accurate alignment and at the same time prevent the deposition of material being handled in the expansion gap.

In practice, however, the described arrangement is not effective to avoid this problem. As with the arrangement described in U.S. Pat. No. 3,077,634, the material being handled penetrated between and under the segments causing a loss of close engagement between the segments and the roll seats. This resulted in deformation of the materials, breakage of parts, and similar problems.

SUMMARY OF THE INVENTION

This invention is directed to improved segment rolls for briquetting and compacting presses whereby the material to be compressed is prevented in a simple and reliable manner from entering between and under the segments. The invention particularly involves the utilization of sealing profiles between opposed side walls of segments. These sealing profiles are located radially inwardly of the material engaging surfaces of the segments and are clamped in this position. During operation of the equipment, the profiles form a barrier to the inward penetration of the material.

The segments are provided with grooves or the like in their opposing side walls. These grooves are designed for receiving the sealing profiles whereby profiles are held in proper position when the segments are assembled with the roll core.

The sealing profiles are formed of a ductile material, and this material is deformed plastically upon assembly and once the briquetting or compacting operation begins. The design of the profiles and associated sealing grooves of the mold segments insures the location of the deformed material in a position such that penetration of the material being handled is effectively avoided. Thus, even if the material being handled is of small particle size, and even under high pressure and temperature conditions, the arrangement of this invention prevents the penetration of the particles inwardly beyond the profiles so that the particles will not enter between and under the segments.

DESCRIPTION OF THE PREFERRED EMBODIMENTS

Figure 1:
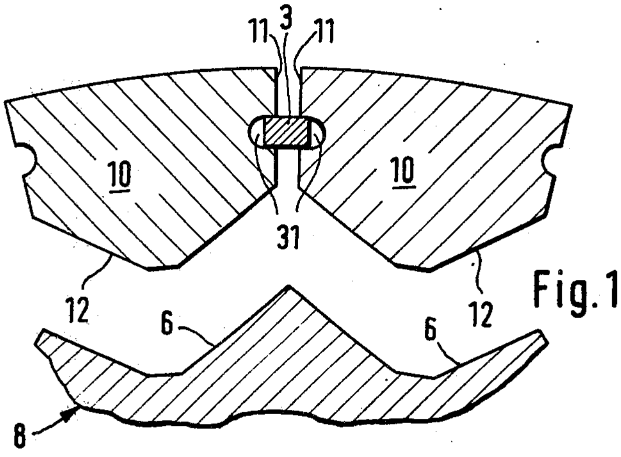
FIG. 1 is a cross-sectional view illustrating a form of roll segment contemplated by this invention in association with a roll core.

In the accompanying drawings, FIG. 1 illustrates a rol! core 8 which is provided for holding roll segments 10. As particularly described in the aforementioned U.S. Pat. Nos. 3,077,634 and 3,938,930, the roll core is provided with seats 6 throughout its periphery. The segments 10 are located in the respective seats to provide a continuous working surface for the roll. This roll will then ordinarily be employed in conjunction with a corresponding roll with the material to be compacted or briquetted being delivered to the nip of the respective rolls. Suitable clamps such as described in the aforementioned patents are utilized for holding the segments in place on the roll core.

As shown in FIG. 1, a gap is defined between the opposed faces 11 of the adjacent segments 10. When such a gap is present during operation of the equipment, particles of material tend to penetrate between these faces 11. In addition, the particles tend to penetrate between the bottom surfaces 12 of the segments and the surfaces of the seats 6. As indicated, the presence of such material can create significant problems.

In accordance with this invention, sealing profiles such as the profile 3 of FIG. 1 are interposed between the faces 11 of the segments 10. Grooves 31 are defined by the segments, and the profile 3 is supported between these grooves.

When these segments are assembled with the roll core, the faces 11 are moved toward each other thereby clamping the profile 3 between the faces. In accordance with this invention, the profile 3 is formed of a ductile material such as soft copper or aluminum. The assembly operation including the radial clamping of the mold segments in accordance with the aforementioned prior art disclosures will result in the compression of the profile 3. This plastic deformation results in the formation of an impenetrable barrier to the passage of particles beyond the profile. It will be appreciated that thermal expansion of segments resulting during operation of the equipment as well as the operating pressure will tend to further compress the sealing profile between the segment faces. This further insures the formation of an impenetrable barrier.

In the illustration of FIG. 1, the sealing profile 3 defines a rectangular cross section with the grooves 31 defining semi-circular bottoms. The groove walls may diverge outwardly from the bottoms to increase the tendency toward clamping of the sealing profile in both a circumferential and radial direction. The cross section of the profile is, as shown, insufficient to fill the grooves 31 prior to assembly of the segments with the roll core. Upon compression of the profile, the grooves are filled; however, little if any of the profile material enters the gap between the faces 11.

Figure 2:
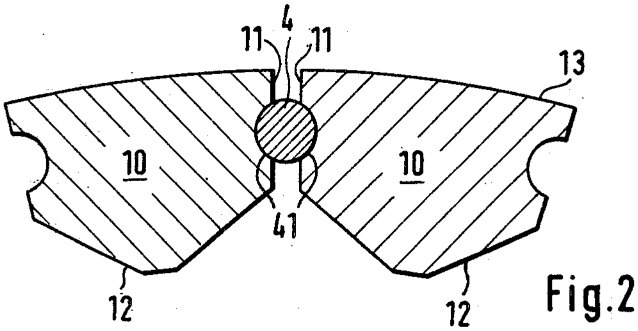
FIG. 2 is a cross-sectional view illustrating an alternative form of roll segment; and, FIG. 3 is a cross-sectional view illustrating an additional alternative form of roll segment.

FIG. 2 illustrates a modified profile 4 and modified sealing grooves 41. The grooves 41 are semi-circular in cross section while the profile 4 is in the form of a rod of circular cross section. In this case, the profile consists of material in excess of the amount necessary for filling the grooves. Accordingly, the plastic deformation occurring upon assembly and during use results in movement of the profile material into the gap between the faces 11. The material being formed is prevented from movement beyond the extent of such plastic deformation.

Figure 3:
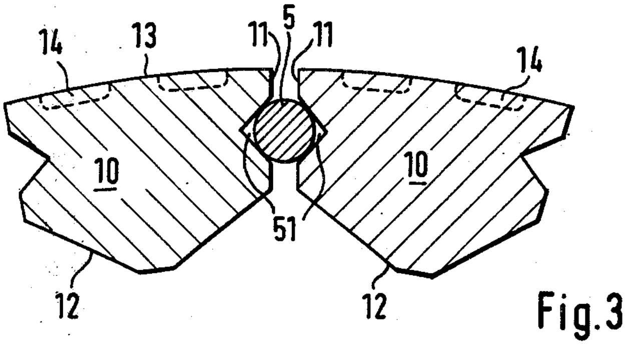

The embodiment of FIG. 3 illustrates pockets 14 defined by the segment working surface 13. These segments are thus particularly designed for the formation of briquets.

The grooves 51 of the segments 10 define a triangular cross section. The sealing profile 5 is in the form of a rod of circular cross section, and upon assembly, this profile is deformed so that the grooves 51 are substantially filled when the side walls 11 are moved into full or substantially full engagement.

It will be appreciated that in addition to the soft copper or aluminum suggested for use in producing the aforementioned profiles, other materials of a ductile or highly elastic and plastic character may be selected. Similarly, the cross sectional shape of such profiles and of the grooves employed for locating the profiles may be varied. It has been found, however, that optimum results can be obtained when utilizing the particular arrangements illustrated.

The grooves 31, 41 and 51 are preferably located at about the midpoints of the walls 11 irrespective of the cross sectional shape of the profiles and grooves. These extend all along the width of the segments whereby the profile material will seal the entire space between the side walls. The rods of rectangular or circular cross section may extend completely into engagement with the retaining rings utilized in the equipment. It will be appreciated that the spacing illustrated between the walls 11 is exaggerated in the drawings. Typically, the mold segments during use will either be in substantial engagement or a gap of approximately 0.1 to 0.25 mm. will exist. Prior to assembly and use, the profiles will have a circumferential length (diameter in the case of the profiles 4 and 5) of from 1–2 mm. The segment length will, of course, determine the length of the profile rods.

It will be understood that various changes and modifications may be made in the above described invention which provide the characteristics of the invention particularly as described in the following claims.

That which is claimed is:

1. In a segmented roll for briquetting and compacting presses comprising separate roll segments, and clamping means firmly holding the segments in side-by-side relationship on the circumference of a roll core, each of said segments defining side walls in face-to-face relationship, the improvement in sealing means for preventing the passage of particles between said faces and between the segments and roll core, said sealing means comprising profiles extending in the direction of the roll axis and positioned between said side walls, grooves formed in the side walls, said grooves extending across the width of said side walls, said segments being held in said grooves, said profiles being formed of ductile metallic material and said profiles being clamped between said side walls when the segments are assembled with the roll core whereby the pressure applied by said clamping means compresses the profiles to provide a sealing relationship between the profiles and the side walls across the width of the side walls, and said profiles being radially spaced from the upper side of the mold segments.

2. A construction as claimed in claim 1 wherein the said grooves are disposed approximately in the middle of the side walls.

3. A construction as claimed in claim 1 wherein said grooves are of semicircular cross-sectional shape.

4. A construction as claimed in claim 1 wherein said grooves have the shape of an isosceles triangle, the base of which lies in the plane of the associated side wall.

5. A construction as claimed in claim 1 wherein said profiles are smaller in cross section and greater in circumferential length in the direction of the roll core when compared with the cross section of said grooves and with the depth of the zone of engagement of said grooves.

6. A construction as claimed in claim 1 wherein profiles are of circular cross sectional shape.

7. A construction as claimed in claim 1 wherein profiles are of substantially rectangular cross-sectional shape.

8. A construction as claimed in claim 1 wherein the sealing profiles are made of soft copper or aluminum.

* * * * *